(12) United States Patent
Salmon et al.

(10) Patent No.: US 8,653,207 B1
(45) Date of Patent: Feb. 18, 2014

(54) PROCESS AND APPARATUS FOR POLYMERIZING ETHYLENE UNDER ULTRA-HIGH PRESSURE

(71) Applicant: Westlake Longview Corporation, Houston, TX (US)

(72) Inventors: Bailey James Salmon, Longview, TX (US); Alan G. Wonders, Richardson, TX (US); Wayne S. Strasser, Kingsport, TN (US)

(73) Assignee: Westlake Longview Corporation, Houston, TX (US)

( * ) Notice: Subject to any disclaimer, the term of this patent is extended or adjusted under 35 U.S.C. 154(b) by 0 days.

(21) Appl. No.: 13/690,535

(22) Filed: Nov. 30, 2012

(51) Int. Cl.
*C08F 2/01* (2006.01)
*B01J 19/18* (2006.01)
*C08F 10/02* (2006.01)

(52) U.S. Cl.
USPC ............ 526/65; 526/918; 422/131; 422/135; 422/226; 422/228

(58) Field of Classification Search
USPC ............ 526/65, 918, 64; 422/135, 226, 131, 422/228
See application file for complete search history.

(56) References Cited

U.S. PATENT DOCUMENTS

| | | | |
|---|---|---|---|
| 2,148,115 A | 2/1939 | Gerhart et al. | |
| 2,245,528 A * | 6/1941 | Loder | 562/417 |
| 2,582,899 A | 1/1952 | Barnebey et al. | |
| 2,897,183 A | 7/1959 | Christl et al. | |
| 3,081,289 A | 3/1963 | Cheney et al. | |
| 3,130,015 A * | 4/1964 | Monroe | 422/226 |
| 3,658,741 A * | 4/1972 | Knutson et al. | 523/309 |
| 3,706,719 A | 12/1972 | Goffinet, Jr. | |
| 3,737,288 A | 6/1973 | Hochman | |
| 4,074,040 A | 2/1978 | Oeder et al. | |
| 4,123,600 A | 10/1978 | Kita et al. | |
| 4,229,416 A | 10/1980 | Donaldson et al. | |
| 4,271,280 A | 6/1981 | Tomura et al. | |
| 4,282,339 A | 8/1981 | Donaldson et al. | |
| 5,145,255 A | 9/1992 | Shimada et al. | |
| 5,839,827 A | 11/1998 | Ogata et al. | |
| 5,965,674 A | 10/1999 | Moen et al. | |
| 7,799,882 B2 | 9/2010 | Jiang et al. | |

OTHER PUBLICATIONS

2010 ASME Boiler & Pressure Vessel Code, Section VIII, Div. 3, "Alternative Rules for Construction of High Pressure Vessels," pp. 99-105 (Jul. 1, 2010).
J.F. Harvey, "Theory and Design of Pressure Vessels," pp. 484-489 (2d ed. 1991), Van Norstrand Reinhold, New York, NY, USA.
J.Y. Oldshue et al., "A Guide to Fluid Mixing," pp. 1-10 and 16-22, Lightnin, Rochester, NY (1992).

* cited by examiner

*Primary Examiner* — Fred M Teskin
(74) *Attorney, Agent, or Firm* — Phan Law Group PLLC

(57) ABSTRACT

The invention relates to a process and apparatus for preparing an ethylene polymer by free radical polymerization under ultra-high pressure. The polymerization is carried out in an autoclave reactor in the presence of a free radical initiator. The autoclave reactor is characterized by having one or more elongated baffles affixed to the interior reactor wall.

15 Claims, 1 Drawing Sheet

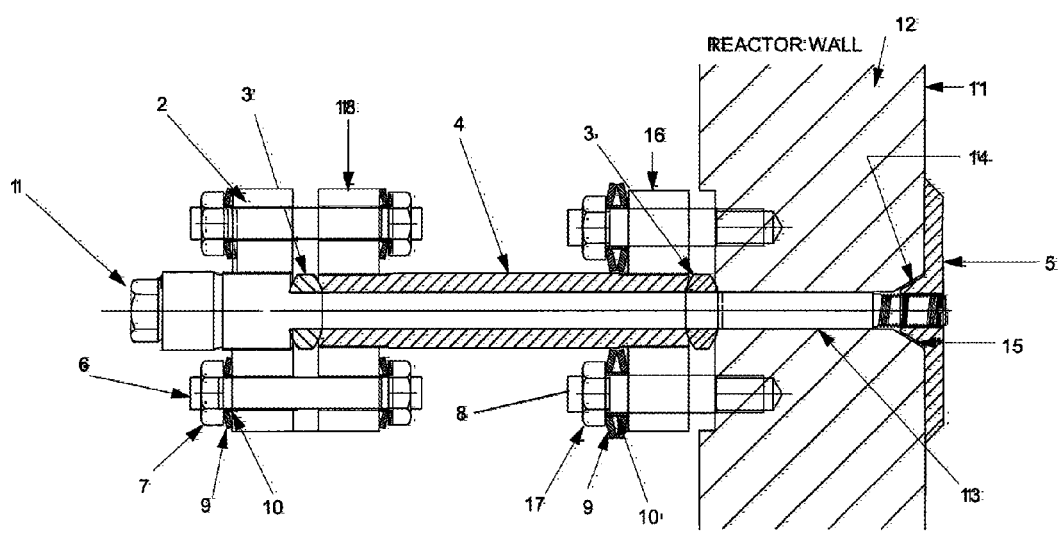

PROCESS AND APPARATUS FOR POLYMERIZING ETHYLENE UNDER ULTRA-HIGH PRESSURE

FIELD OF THE INVENTION

The invention relates to a process and apparatus for preparing an ethylene polymer by free radical polymerization under ultra-high pressure.

BACKGROUND OF THE INVENTION

Low-density polyethylene and copolymers of ethylene with polar co-monomers can be produced by free radical polymerization at high temperature (e.g., 100-350° C.) and ultra-high pressure (e.g., 10,000-50,000 psig). These reactions are often carried out in a thick-walled autoclave reactor specially designed to withstand the extreme operating conditions.

To control temperature and polymer concentration, intense agitation to establish uniformity throughout the reactor is required. If regions within the reactor are insufficiently agitated, polymerization in such localized zones can rise above that in the rest of the vessel, and the temperature can rise in those areas to form hot spots and cause runaway decompositions.

To improve mixing, radial-impeller stirrers have been developed. These stirrers perform better than the prior generation of stirrers, which contain a large number of agitating paddles. However, users of the newer stirrers are still experiencing a high tendency of runaway decompositions, especially in reactors larger than 250 liters (L) and in those operating at hot top-zone conditions (e.g., >200° C.).

It has been surprisingly discovered that these newer stirrers provide too little axial and radial flow and mixing, despite providing quite a high rotational flow.

One potential solution to this problem is to employ wall baffling. However, with an ultra-high pressure autoclave, there are important mechanical reasons to avoid welding and thread-bolting appurtenances to the wall of the main cylindrical body. For example, at 3200 psig, the steel used to make the reactor wall can be welded without fear of developing stress cracks. On the other hand, at 10,000 psig, the conditions are much more severe, and the potential of developing stress cracks is very real. The mechanical stresses are very high on the main cylinder wall of a commercial scale autoclave at pressures greater than 10,000 psig. Indeed, the material of choice is typically a steel alloy with unusually high tensile strength in order to cope with the extreme pressure. Unfortunately, such steels have a greater tendency to crack.

Generally, all bores into the cylinder wall go completely through and are carefully chamfered and polished at the inside surface in order to remove stress risers that would serve as crack initiation points. In addition, the vessel must also undergo periodic stripping and crack-detection inspections. Thus, attaching a wall baffle by threading a stud or bolt to the inside surface of the cylinder is not considered to be a viable option, since even rolled threads (contrast to cut threads) pose too much cracking risk and inspection difficulty. Similarly, welding a wall baffle to the inside surface of the cylinder would degrade the integrity of the quenched and forged metal, making it either weaker or harder, and thus more prone to cracking.

Accordingly, there is a need in the art to improve mixing in an autoclave reactor for ultra-high pressure ethylene polymerization processes in order to suppress decompositions and to improve product properties. The present invention is directed to addressing this need as well as others that will become apparent from the following description and the appended claims.

SUMMARY OF THE INVENTION

The invention is as set forth in the appended claims.

Briefly, in one aspect, the present invention provides a process for preparing an ethylene polymer. The process comprises polymerizing ethylene and optionally a co-monomer in the presence of a free radical initiator in an autoclave reactor at a pressure ranging from 10,000 to 50,000 psig and a temperature ranging from 120 to 340° C. The autoclave reactor comprises a top-head plate, a bottom-head plate, and a vertically-oriented, hollow cylindrical body comprising an interior vertical wall. The autoclave reactor comprises one or more elongated wall baffles whose length extends vertically along the interior vertical wall.

In another aspect, the present invention provides an autoclave reactor for preparing ethylene polymer by free radical polymerization. The reactor comprises (a) a vertically-oriented, hollow cylindrical body comprising an interior vertical wall, (b) a top-head plate for enclosing the top of the cylindrical body, (c) a bottom-head plate for enclosing the bottom of the cylindrical body, (d) one or more elongated wall baffles whose length extends vertically along the interior vertical wall, and (e) one or more reaction zones capable of operating at a pressure ranging from 10,000 to 50,000 psig and a temperature ranging from 120 to 340° C.

BRIEF DESCRIPTION OF THE DRAWINGS

The drawing is a cross-sectional view of a reactor wall with a wall baffle attached to the inside surface according to the invention.

DETAILED DESCRIPTION OF THE INVENTION

As used herein, "ethylene polymer" refers to a polymer made by homopolymerizing ethylene or by copolymerizing ethylene with at least one other compound copolymerizable with ethylene. Accordingly, suitable monomers are ethylene and a mixture of ethylene with any other co-monomer that can conventionally be copolymerized with ethylene under ultra-high pressure conditions in the presence of a free radical initiator. Examples of such co-monomers include acrylic acid and its esters, e.g., methyl acrylate, ethyl acrylate, n-, iso-, and tert-butyl acrylate, and 2-ethylhexyl acrylate and the corresponding methacrylates; vinyl esters such as vinyl acetate, vinyl propionate, and vinyl pivalate; methacrylic acid and its esters; vinyl ethers; vinyl ketones; acrylonitrile; acrylamide; unsaturated hydrocarbons, e.g., propylene, butene, or hexene; carbon monoxide; sulfur dioxide; and mixtures thereof.

A particularly useful ethylene polymer is low-density polyethylene (LDPE). LDPE is an ethylene homopolymer characterized by having a density in the range of 0.900-0.940 g/cm$^3$, particularly in the range of 0.910-0.935 g/cm$^3$, or more particularly in the range of 0.910-0.930 g/cm$^3$.

Examples of free radical initiators include oxygen, inorganic peroxides, organic peroxides, oximes, azines, and azo compounds. Specific examples of useful initiators include hydrogen peroxide; di-t-butyl peroxide; diethyl peroxide; methylethyl ketone peroxide; t-butyl hydroperoxide; acetyl peroxide; benzoyl peroxide; dioctanoyl peroxide; succinic acid peroxide; 3-hydroxy-1,1-dimethylbutyl peroxyneodecanoate; α-cumyl peroxyneodecanoate; 2-hydroxy-1,1-dimethyl butyl peroxyneoheptanoate; α-cumyl peroxyneoheptanoate; t-amyl peroxyneodecanoate; t-butyl peroxyneodecanoate; di(2-ethylhexyl) peroxydicarbonate; di(n-propyl) peroxydicarbonate; di(sec-butyl) peroxydicarbonate; t-butyl peroxyneoheptanoate; t-amyl peroxypivalate; t-butyl peroxypivalate; diisononanoyl peroxide; didodecanoyl peroxide; 3-hydroxy-1,1-dimethylbutylperoxy-2-ethylhexanoate; didecanoyl peroxide; 2,2'-azobis(isobutyronitrile); di(3-carboxypropionyl) peroxide; 2,5-dimethyl-2,5-di (2-ethylhexanoylperoxy)hexane; dibenzoyl peroxide; t-amylperoxy 2-ethylhexanoate; t-butylperoxy 2-ethyl hexanoate; t-butyl peroxyisobutyrate; t-butyl peroxy-(cis-3-carboxy)propenoate; 1,1-di(t-amylperoxy)cyclohexane; 1,1-di (t-butylperoxy)-3,3,5-trimethylcyclohexane; 1,1-di(t-butylperoxy)cyclohexane; OO-t-amyl O-(2-ethylhexyl) monoperoxycarbonate; OO-t-butyl O-isopropyl monoperoxycarbonate; PP-t-butyl O-(2-ethylhexyl) monoperoxycarbonate; 2,5-dimethyl-2,5-di(benzoylperoxy)hexane; t-amyl peroxyacetate; t-amyl peroxybenzoate; t-Butyl Peroxyisononanoate; t-butyl peroxyacetate; t-butyl peroxybenzoate; di-t-butyl diperoxyphthalate; 2,2-di(t-butylperoxy)butane; 2,2-di(t-amylperoxy)propane; n-butyl 4,4-di(t-butylperoxy) valerate; ethyl 3,3-di(t-amylperoxy)butyrate; ethyl 3,3-di(t-butylperoxy)butyrate; dicumyl peroxide; α,α'-bis(t-butylperoxy)diisopropylbenzene; 2,5-dimethyl-2,5-di(t-butylperoxy) hexane; di(t-amyl) peroxide; t-butyl α-cumyl peroxide; 2,5-dimethyl-2,5-di(t-butylperoxy)-3-hexyne; oximes such as acetone oxime and the like; azines such as benzylidene azine and the like; and azo compounds such as azobis (isobutyronitrile), 2,2'-azobis (methylisobutylate), and azobis (isobutylamide). The amount of initiator used can vary from 5 to 3,000 parts by weight of the total reaction medium.

The ultra-high pressure polymerization can be carried out in the presence of conventional molecular weight regulators used in conventional amounts. Examples of suitable regulators include saturated hydrocarbons such as propane, butane, hexane, and cyclohexane; ketones such as acetone and methyl ethyl ketone; aldehydes; alcohols such as isopropanol and n-butanol; and hydrogen.

The polymerization of ethylene, in the presence or absence of other compounds, is carried out at pressures ranging from 10,000 to 50,000 psig, preferably from 15,000 to 40,000 psig. The polymerization temperature can range from 120 to 340° C., preferably from 150 to 310° C. The conditions for polymerization can be achieved in autoclave reactors built for such conditions.

Such reactors typically have hollow cylindrical bodies. Their central axis is positioned vertically during operation. The interior of the vessels, in most cases, has a ratio of height to inside diameter of the circular cross-section of from 1:1 to 20:1, preferably from 2:1 to 10:1. For many commercial reactors, the inside diameter of the vessels can range from 12 to 40 inches, and the inside height of the vessels can range from 8 to 30 feet; but other dimensions are possible. On an industrial scale, the volume of these vessels can vary, e.g., from 250 L to 2,500 L. The vessels are typically made of an alloy steel containing Ni, Cr, and Mo, such as SA-4340, or Ni, Cr, Mo, and V, such as SA-723, but other materials are possible. The vessels typically have thick walls to withstand the ultra-high pressures. The wall thickness can be defined by the ratio of the outside diameter to the inside diameter (OD/ID) of the circular cross-section of the reactor body. Generally, the OD/ID ratio can range from 1.5 to 2.5. In a typical commercial reactor, the wall thickness is on the order of 4 to 10 inches. The cylindrical reactor bodies may include jackets for heating or cooling the reactor wall.

The invention is applicable to single-zone autoclave reactors as well as multi-zone autoclave reactors. The multi-zone autoclave reactors are subdivided by one or more horizontal partitions, such as horizontally disposed baffles. These baffles are preferably affixed to the stirrer, and divide the reactor volume into two to five zones typically. The zones can have different volumes. Each zone is usually equipped with thermocouples and feed lines for fresh ethylene and initiator.

The multi-zone autoclave reactors may be run with a temperature profile. For example, the temperature in the top zone may be moderately high, e.g., 150 to 200° C., while the temperature in the bottom zone may be high, e.g., 280 to 310° C., to adjust the final properties of the polymer. The initiator feed and the split of fresh ethylene to the zones can be used to control the temperature profile. For example, different initiators can be introduced into each zone. Moreover, since ethylene polymerization autoclave reactors are run adiabatically, the fresh ethylene entering a reactor zone can remove the heat of reaction from that zone and thereby lower its temperature.

The autoclave reactors are fitted with a top-head plate and a bottom-head plate for enclosing the top and bottom openings of the cylindrical reactor body. These plates can be dome-shaped, but are more typically flat. In most cases, the plates are thicker than the main cylindrical body wall, because the stress distribution is much different on these plates. The top-head plate is removable. The bottom-head plate will usually have a gas and polymer outlet. In addition, the bottom-head plate typically has channel(s) for running steam or hot oil through it for heating. The bottom-head plate may also be removable.

The autoclave reactors are also equipped with a high-speed rotary stirrer driven by a motor. Various single-zone or multi-zone rotary stirrers are commercially available. The stirrer design, however, should ensure that a certain distance from the wall baffles fitted into the autoclave is maintained, in order for the stirrer to be easily inserted into and removed from the cylindrical body. In a preferred embodiment, the stirrer would have paddles as well as paddle/horizontal baffle combinations affixed to it. The paddle/horizontal baffle combinations can resemble an inverted can with paddles up inside the can body. The horizontal can surface would act as the horizontal baffle and define the reactor zones.

Typical rotational stirrer speed can range from 500 to 1,800 rpm, and more typically from 700 to 1500 rpm.

In accordance with the invention, the inside cylindrical wall of the autoclave reactor is provided with one or more elongated wall baffles. The wall baffles have a length that is greater than their width and depth. The length of the wall baffles extends vertically, so as to be generally parallel with the central axis of the cylindrical reactor body. The precise dimensions and the number of the wall baffles used may vary, depending on the needs of a particular reactor set-up and operating conditions employed. Generally, however, the wall baffles should be of sufficient length and depth, and of sufficient number, so as to convert rotational flow into axial flow. The conversion of rotational flow into axial flow would also necessarily increase the radial flow toward the stirrer shaft.

As a general guide, the wall baffles can have a thickness in the radial direction (i.e., depth) of D/25 to D/100 where D is the inside diameter of the reactor body. Preferably, the wall baffles have a radial thickness of D/40 to D/60. In a typical commercial autoclave reactor for ethylene polymerization, the wall baffles can have a radial thickness (t) of $0<t\leq2$ inches, preferably $0<t\leq1$ inch, and more preferably in the range of 0.25 to 1 inch.

The width of the wall baffles is not particularly limited. It can vary over a wide range. The wall baffle width at the point of attachment to the reactor wall should be wide enough for the attachment mechanism, but otherwise can be very thin to inches thick. For example, the wall baffle width can range from 0.1 inch at its narrowest portion to 5 inches at its widest portion. The baffle width can also be uniform over its length and can range, e.g., from 1 to 5 inches.

Since wall baffles create drag and thereby increase power demand on the motor driving the stirrer for a given rotational speed, the number and dimensions of the wall baffles employed may be limited by the available power of the stirrer motor. It has been surprisingly found, however, that even one wall baffle per zone can improve process results, and the length of the wall baffle can be trimmed to consume all the available power from the existing power supply and motor. In particular, it has been surprisingly found that wall baffles having a length less than the full length of the reactor wall or even less than the full length of a particular reaction zone can create more chaotic mixing without significantly decreasing the rotational velocity of the reaction mixture or significantly increasing the power demand on the stirrer motor at the same rotational speed.

In one embodiment, each wall baffle would extend from 0.1 to 25% of the inside height of the reactor. In another embodiment, each wall baffle would extend from 0.5 to 20% of the inside height of the reactor. In another embodiment, each wall baffle would extend from 1 to 10% of the inside height of the reactor. For example, in a 20-foot reactor, each wall baffle can have a height of 4 to 20 inches.

The vertical placement of the wall baffles within each zone (assuming the baffle length does not extend the entire length of the zone) can affect the degree of mixing in that zone. Preferably, the wall baffles are positioned near the far end of a given stirring loop in each zone. In the case of zones with top-mounted impellers, for example, the preferred location would be as low in those zones as possible.

In one preferred embodiment, the autoclave reactor according to the invention has four reaction zones. The zone closest to the top-head plate has two wall baffles. The two middle zones have one wall baffle each. And the zone closest to the bottom-head plate has no wall baffles.

To avoid creating stress risers, the wall baffles may be machined into the inner wall of the reactor cylinder during its formation. It is more preferable, however, to attach the wall baffles to the interior vertical wall of the reactor cylinder after its formation. The latter mode provides more flexibility. The size, location, and number of wall baffles may be tailored to the specific needs of a particular process.

The present inventors have surprisingly discovered that wall baffles may be affixed to the interior vertical wall of the reactor cylinder, after its formation, without creating stress risers. In accordance with the present invention, the wall baffles are affixed to the inner wall of the reactor cylinder through one or more of the existing non-threaded, cross-bore holes in the reactor cylinder wall. The autoclave reactor cylinder is typically made with a number of non-threaded cross-bore holes for various purposes such as for ethylene feed, initiator injection quills, and thermocouples. But typically there are a few that are unused. According to the invention, the normally blanked standpipes at the spare cross-bore wall holes would be replaced with a standpipe assembly comprising an anchoring and tensioning rod for holding the wall baffle securely against the inner wall of the reactor cylinder. Each vertical wall baffle may be anchored at the wall cross-bore hole, somewhere along the baffle's length; preferably near its midpoint. The wall baffle should be held firmly in contact with the inner reactor wall so that it does not flutter or rotate during normal reactor operation.

The drawing is a cross-sectional view of a device for securing an elongated wall baffle 5 to the interior cylindrical reactor wall 11 according to the invention. The reactor wall 12 has a cross-bore hole 13 with a beveled edge 14. The wall baffle 5 is formed with a raised surface 15 near its center to mate with the beveled edge 14. At approximately the center of the raised surface, the wall baffle 5 has an internal threaded hole for mating with a hex bolt 1 (also known as a solid drawbar), like that of a nut. The hex bolt 1 has external threads at one end for engaging with the wall baffle 5, a tightening nut at the opposite end, and an extended shank to accommodate a stand-off pipe 4. The stand-off pipe 4 allows the hex bolt 1 to be loosened or tightened with minimal potential damage to the reactor wall 12. The stand-off pipe 4 has flanges 16, 18 at opposite ends. The flange 16 is secured on the outside surface of the reactor wall 12 by four entry studs 8 and nuts 17 with washers 9 and plastic sleeves 10 in between the nuts 17 and the flange 16. The entry studs 8 are screwed into the reactor wall 12. For a gas-tight seal, at opposite ends of the stand-off pipe 4 are high-pressure lens rings 3. One lens ring 3 is located between the stand-off pipe 4 and the reactor wall 12, and the other lens ring 3 is located at the opposite end of the stand-off pipe 4 and an unheated flange 2. The unheated flange 2 and the flange 18 on the stand-off pipe 4 are secured together using four unheated joint studs 6 and unheated joint nuts 7, also with washers 9 and plastic sleeves 10 in between them. The wall baffle 5 can be held in place by tightening the hex bolt 1. By using the existing cross-bore holes 13 in the reactor wall 12 to attach the wall baffles 5, stress risers can be minimized because the holes 13 are non-threaded and have beveled inside edges.

In one embodiment of the invention, the bottom-head plate may have affixed to it one or more baffles that project upwardly into the interior volume of the reactor. In a preferred embodiment, the bottom-head plate is provided with a plate with one or more baffles on it, and the plate with the baffles is secured to the bottom-head plate by one or more threaded bolt holes in the bottom-head plate. Thread bolting in the bottom-head plate is permissible because the stresses in it are compressive. Likewise, the use of threaded fasteners on the outside of the reactor vessel body are acceptable because metal stresses in this area are around half of the stress on the inside of the vessel. It is the inside wall of the main cylinder where stresses come to a maximum for the alloy steels used in ultra-high pressure design.

The bottom-head plate baffles may range in number, e.g., from 2 to 8. The size of the bottom-head plate baffles may vary, depending on the desired degree of mixing, the available space at the bottom of the reactor, and the available motor power. Typically, the bottom-head plate baffles have a radial length of 2 to 8 inches, a width of 0.1 to 1 inch, and a height of 0.5 to 2 inches.

Both the wall baffles and the bottom-head plate baffles may be made of any material that is substantially inert and capable of withstanding the polymerization conditions without substantial deformation. For example, the baffles may be made from 4140 SAE-grade alloy steel. This material is characterized by having an excellent strength to weight ratio and is considerably stronger and harder than standard 1020 steel.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered to be approximations. These values and ranges may vary from their stated numbers depending upon the desired properties sought to be obtained by the present invention as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90 and 70 to 80.

This invention can be further illustrated by the following examples of preferred embodiments thereof, although it will be understood that these examples are included merely for purposes of illustration and are not intended to limit the scope of the invention. Unless otherwise indicated, all percentages are by weight.

Example

The stirring in an ultra-high pressure autoclave reactor with four reaction zones was analyzed with and without the wall baffles according to the invention using Computational Fluid Dynamics. Prior to this work, it was thought that all of the reaction zones were fairly well stirred. Surprisingly, during the study, hot spots due to poor stirring were discovered within each zone. For example, in the study, the second zone had a spot that was a surprising 50° C. above average. The computational model showed a decrease in the hot spot temperature of 27° C. when one wall baffle (having the dimensions of 0.5 inches deep×2 inches wide×8.625 inches high) was inserted into that zone. For the third zone, the hot spot without a wall baffle was 48° C. above average. When one wall baffle (having the dimensions of 0.5 inches deep×2 inches wide×15.5 inches high) was inserted into the third zone, the hot spot decreased in temperature by 25° C. This improvement should greatly decrease the possibility of unwanted chemical reaction.

The invention has been described in detail with particular reference to preferred embodiments thereof, but it will be understood that variations and modifications can be effected within the spirit and scope of the invention.

We claim:

1. A process for preparing an ethylene polymer, the process comprising:
    polymerizing ethylene and optionally a co-monomer in the presence of a free radical initiator in an autoclave reactor at a pressure ranging from 10,000 to 50,000 psig and a temperature ranging from 120 to 340° C.,
    wherein the autoclave reactor comprises a top-head plate, a bottom-head plate, and a vertically oriented, hollow cylindrical body comprising an interior vertical wall; and
    wherein the autoclave reactor comprises one or more elongated wall baffles whose length extends vertically along the interior vertical wall.

2. The process according to claim 1, wherein the elongated wall baffles are affixed to the interior vertical wall through one or more non-threaded, cross-bore holes in the vertical wall.

3. The process according to claim 1, wherein the autoclave reactor comprises two or more reaction zones defined by one or more horizontal partitions, and wherein at least one of the reaction zones comprises one or more of the elongated wall baffles.

4. The process according to claim 3, wherein the autoclave reactor comprises four reaction zones, and wherein the two middle reaction zones comprise one elongated wall baffle each.

5. The process according to claim 4, wherein the reaction zone closest to the top-head plate comprises two elongated wall baffles.

6. The process according to claim 1, wherein the elongated wall baffles have a radial thickness of D/25 to D/100 where D is the inside diameter of the reactor.

7. The process according to claim 6, wherein the elongated wall baffles have a radial thickness of D/40 to D/60.

8. The process according to claim 1, wherein the elongated wall baffles have a radial thickness of 0.25 to 1 inch.

9. An autoclave reactor for preparing ethylene polymer by free radical polymerization, the reactor comprising:
    (a) a vertically oriented, hollow cylindrical body comprising an interior vertical wall;
    (b) a top-head plate for enclosing the top of the cylindrical body;
    (c) a bottom-head plate for enclosing the bottom of the cylindrical body;
    (d) one or more elongated wall baffles whose length extends vertically along the interior vertical wall; and
    (e) one or more reaction zones capable of operating at a pressure ranging from 10,000 to 50,000 psig and a temperature ranging from 120 to 340° C.,
    wherein the elongated wall baffles are affixed to the interior vertical wall through one or more non-threaded cross-bore holes in the vertical wall.

10. The autoclave reactor according to claim 9, which comprises two or more reaction zones defined by one or more horizontal partitions, wherein at least one of the reaction zones comprises one or more of the elongated wall baffles.

11. The autoclave reactor according to claim 10, which comprises four reaction zones, wherein the two middle reaction zones comprise one elongated wall baffle each.

12. The autoclave reactor according to claim 11, wherein the reaction zone closest to the top-head plate comprises two elongated wall baffles.

13. The autoclave reactor according to claim 9, wherein the elongated wall baffles have a radial thickness of D/25 to D/100 where D is the inside diameter of the reactor.

14. The autoclave reactor according to claim 13, wherein the elongated wall baffles have a radial thickness of D/40 to D/60.

15. The autoclave reactor according to claim 9, wherein the elongated wall baffles have a radial thickness of 0.25 to 1 inch.

* * * * *